United States Patent Office

3,089,779
Patented May 14, 1963

---

3,089,779
DIELECTRIC CERAMIC AND METHOD OF PREPARING SAME
Roland C. King, 1445 Marianna Road, Pasadena, Calif.
No Drawing. Filed Oct. 2, 1961, Ser. No. 141,949
2 Claims. (Cl. 106—39)

This invention relates generally to modified barium titanate compositions, and more particularly concerns a novel composition of this type in what may be characterized as medium high "K" dielectric ceramic form, having essentially uniform and stable physical and electrical characteristics over a wide range of temperatures.

It is known among those utilizing barium titanate ceramic dielectric that common forms of this material have undesirable capacitance variations over the temperature ranges frequently encountered by electronic equipment in which the dielectric material is used. As an example, in the temperature range 110° C. to 130° C. the capacitance index or "K" of the material rises to several times the "K" value at room temperature (say 25° C.).

A major object of the present invention is to provide a barium titanate ceramic dielectric material that is characterized as maintaining a substantially constant "K" value, i.e. within plus or minus 10% of the nominal "K" value, over the temperature range −50° C. to +150° C., and accordingly, the invention eliminates undesirable variations in "K," maintaining a high value thereof within the desired temperature range.

Other objects of the invention include the provision of a ceramic dielectric comprising an excellent electrical insulator so that thin pieces of the ceramic may withstand high voltage application over long time periods, for high reliability; the provision of a ceramic dielectric that will not exhibit undesirably great changes in dielectric constant in response to voltage application; and the provision of a ceramic material that is economically feasible to process from readily available materials.

Barium titanate forms in a perovskite structure comprised of barium, titanium and oxygen molecules. It has been found that this type structure can be modified by introducing other atoms in replacement of barium or titanium, or both, in varying small percentages. These modifying agents alter the electrical and mechanical properties of the barium titanate ceramic material, and as a result certain properties which are desired in the finished ceramic can be obtained, through controlled modification, within reasonably close limits. It has now been found that highly desirable properties for the material are obtained by using certain preparation techniques and also compositions that fall within a rather narrow range comprising 89–91 mol percent barium titanate, 6–8 mol percent bismuth stannate, and 2.5 to 4.5 percent cobalt titanate. As an example, the composition of Table I below has been found to exhibit exceptionally good mechanical and electrical properties:

*Table I*

| Material | Percent by Wt. | Mol Percent |
|---|---|---|
| Barium Titanate | 85.12 | 89.76 |
| Bismuth Stannate | 12.75 | 6.85 |
| Cobalt Titanate | 2.13 | 3.39 |
|  | 100.00 | 100.00 |

The barium titanate, bismuth stannate and cobalt titanate used in the above example were commercially obtained materials, and they were weighed in fine powder form into a batch in the proportions given in Table I. To the batch there were added sufficient of an organic resinous temporary binder known as Acryloid with the solvent ethylene dichloride to produce a spreadable slurry after ball milling of the batch. The slurry was then filmed uniformly over a horizontal surface, and then heated to remove the solvent and to cure the resin, providing a tough, strong resilient sheet of uniform thickness having the oxide powders suspended in the resinous binder.

The formed sheet was then punched with matched punch and die sets to desired end product shape and size, and the small flexible pieces were loaded on refractory supporting plates of zirconium oxide for further processing in a high temperature kiln. Within the tunnel type, electrically heated, ceramic firing kiln the ware was preheated to burn off the temporary binder resin and then heated further for about an hour at elevated sintering temperature for recrystallizing the ceramic powder, before the ware entered the cooling zone. Kiln adjustments were maintained by temperature controlling instruments maintaining desired sintering temperatures within plus or minus 3° F. The maximum sintering temperature was in the range 2400° to 2500° F., and was adjusted according to the load and feed rate through the kiln.

The fired ceramic pieces, having decreased area due to the loss of temporary binder and shrinkage due to recrystallization of oxide powders, nevertheless were flat, free of porosity, uniform in thickness, and quite strong. Fired pieces ½ inch by 3 inches in area and .004 inch thick were easily handled, and could be used as fired or cut into smaller pieces for end use.

As a final step in the preparation of the ceramic for testing, fixed areas of silver frit conductive film were coated and fired on opposite sides of the ceramic sheet, within close registration tolerances and having at least the thickness of the dielectric sheet as separation insulation. Wire leads were then solder attached to the silvered surfaces, other type conductive adhesives being usable. The wire leads were then connected to measuring instruments for evaluation of the dielectric sheet properties.

Tests showed that the "K" values of typical ceramics (having compositions within the recited ranges) remained within the range −15% to +15% of the "K" value at room temperature (25° C.) over the temperature range −55° C. to +150° C., typical room temperature "K" values for different pieces of the sheet having medium values ranging from 850 to 1050.

Another test showed that the "K" value did not change by more than 15% in response to application of D.C. voltages up to 40 volts per mil thickness, at room temperatures (25° C.). Also, the "K" value did not change by more than 8% in response to application of frequencies from 400 c.p.s. to 1 megacycle. Finally, the leakage resistance, or insulating value, of the finished ceramic remains high and little changed, as measured before and after application of 400 volts D.C. at 150° C. for 1000 hours.

The barium titanate used in the example given above may be expressed as a composition of $BaO$, $TiO_2$ and trace additives. A typical sample has the following percentage analysis:

Table II

| | | | |
|---|---|---|---|
| $B_2O_3$ | <.01 | $V_2O_5$ | 0.01 |
| $SiO_2$* | 0.31 | CuO | .001 |
| $P_2O_5$* | 0.015 | ZnO | <.2 |
| $ZrO_2$ | 0.01 | BaO* | 64.25 |
| $Sb_2O_3$ | <.01 | SrO** | 0.24 |
| $HfO_2$ | <.02 | $Na_2O$** | 0.20 |
| $Al_2O_3$* | 0.24 | $Li_2O$ | <.005 |
| $Fe_2O_3$ | 0.01 | $K_2O$ | 0.03 |
| $MnO_2$ | .001 | $SO_3$* | 0.35 |
| PbO | <.005 | $CO_2$* | 0.46 |
| MgO | .005 | Ig. Loss* | 0.66 |
| $SnO_2$ | <.005 | 325** | 0.04 |
| $Nb_2O_5$ | <.01 | μ Size | 1.69 |
| $WO_3$ | <.05 | BaO Deficit | 1.99 |
| $Cr_2O_3$ | <.002 | Bulk Density, lbs./cu. ft. | 115 |
| NiO | <.005 | | |
| $TiO_2$* | 33.68 | | |
| $MoO_3$ | <.01 | | |
| CaO** | 0.09 | | |

*Chemical analysis.
**Flame analysis.

The bismuth stannate used has the formula $Bi_2(SnO_3)_3$, and the cobalt titanate used has the formula $CoTiO_3$.

I claim:

1. A substantially temperature stabilized ceramic dielectric having the composition 89–91 mol percent barium titanate, 6–8 mol percent bismuth stannate, and 2.5–4.5 mol percent cobalt titanate, the ceramic K value ranging from 850 to 1050.

2. The method of preparing a modified barium titanate thin sheet ceramic dielectric, that includes forming a thin sheet comprised of comminuted solid materials in the proportions 89–91 mol percent barium titanate, 6–8 mol percent bismuth stannate and 2.5–4.5 percent cobalt titanate in a heat curable organic resinous binder, heating the sheet to cure the resinous binder, and then subjecting the sheet to sintering temperatures for sufficient time to burn off the binder resin and recrystallize the said solid materials.

References Cited in the file of this patent

UNITED STATES PATENTS

| | | |
|---|---|---|
| 2,658,833 | Coffeen et al. | Nov. 10, 1953 |
| 2,908,579 | Nelson et al. | Oct. 13, 1959 |
| 3,013,977 | Berman et al. | Dec. 19, 1961 |

OTHER REFERENCES

Baldwin, Ceramic Industry, "How To Use Electronic Ceramics Better," September 1958, pages 132–136.